2,780,094

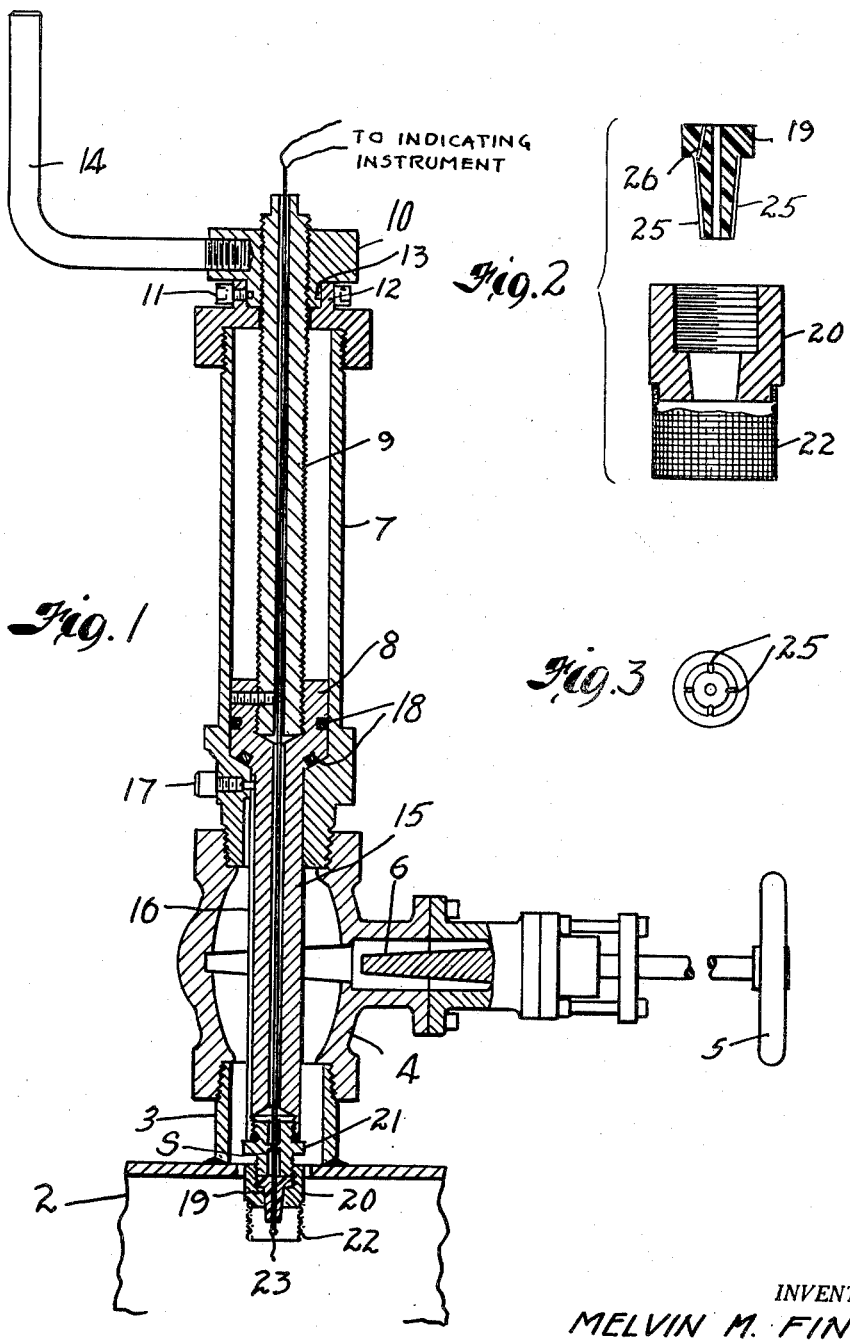

PIPELINE MOUNT FOR THERMISTOR INSTALLATION

Melvin M. Fink, Cleveland, Ohio, assignor to The Standard Oil Company, Cleveland, Ohio, a corporation of Ohio Application April 22, 1954, Serial No. 424,865

6 Claims. (Cl. 73—53)

In pipelines carrying liquid or gaseous hydrocarbons, and particularly in such pipelines subject to large scale usage, where there are occasional changes of the particular materials transmitted, it is important to have information as exact as possible as to the change in the pipeline content as such may occur. By the present invention, an especially high precision detection of change in content or "slug" flowing in the pipeline may be had, with mounting means which affords particular convenience and adaptability. And thus, employing a detector means, as a thermistor or element sensitive in detection of slight changes for instance in the thermal conductivity of liquids flowing in the pipeline (different liquids having the property of absorbing heat differently, and so giving appropriate signals when there is a change in the product or "slug" flowing); and thereby an outstanding accuracy of tracement of "slug" change is made available. Other objects and advantages of the invention will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal section view of mounting means in conjunction with a pipeline in accordance with the invention;

Fig. 2 is an exploded, enlarged scale detail sectional view of a portion thereof; and Fig. 3 is an end view of the taper sealing means.

In general, a pipeline for the present installation is equipped with a nipple through which and through an associated gate valve housing a detector means may be inserted or withdrawn when the gate valve is in appropriate position, and the detector means is on carrier means which facilitates the manual movement thereof as desired, suitable electric conductor means being arranged in connection with the detector element.

As illustrated in Fig. 1, the pipeline 2 has a projecting nipple 3, and on this is a gate valve 4 with suitable manually-operated means such as a hand wheel 5 for moving the valve 6 into and out of position. As seen, with the valve retracted, the lumen is opened through into the pipeline and when the valve is closed the pipeline is isolated from the structure beyond the gate valve. Such structure here involves a piston-containing cylinder 7 for a piston or plunger 8 slidable within the cylinder, and having an extending stem 9 which is screw-threaded and coacts with an operating nut 10 on the end of the cylinder. The nut is rotatable, but is held against axial displacement by a set screw 11 whose inner end extends through a flange 12 on the cap and into an annular groove 13 in the nut. An operating handle 14 allows convenient turning of the nut to raise or lower the screw-threaded stem and piston and associated elements carried thereby. A smooth stem 15 extends from the piston toward the pipeline, and by a longitudinal groove 16 in the side thereof to ride on the inner end of an indexing set screw 17, rotary movement of the piston or plunger in its ascent or descent is prevented. Suitable piston packing ring means 18 assure against leakage of pressure fluid from the pipeline past the piston or plunger. At the pipeline end of the piston or plunger stem securing means for the detector element includes a holder 19 in a locking cap 20 screw-threaded onto the end of a support plug 21 which in turn is screwed into the end of the piston or plunger stem. The locking cap 20 carries a protecting screen 22 to surround and guard the detector element 23 which projects from the end of the stem. A bore extends throughout the length of the stem and carries the electric conductor means which is engaged by a hermetic seal $s$ in the support plug 21 and which connects from the detector element to its indicating instrument which is at a convenient location; and which for a thermistor for instance is responsive to changes in resistance. The holder 19 is a taper element of a suitable plastic, for instance a fluorinated type, such as "Teflon," this taper element being provided with spaced longitudinal grooves 25 on its periphery, whereby as the taper seal is wedged against the corresponding taper surfaces of the interior of the locking cap 20 there is sufficient yielding compression to hold the detector. A fine caliber bore or duct 26 is desirable from the inner end of the member 19 diagonally out to its periphery, whereby to permit any necessary equalization of pressure within and without the cylinder.

By reason of the form of mounting here concerned, a particular advantage is that the detector element can be retracted within the housing, and the gate valve be closed, and the pipeline can be cleaned, and the detector element again be projected in the pipeline to detect changes in the pipeline content or "slug." Thus, the sensitive element is one which is responsive to small changes in temperature and effective on electrical resistance. A thermistor is especially desirable, or at least some form of thermo-couple which is temperature-sensitive.

The operation of the device is readily understood from the foregoing. With the piston stem fully retracted and gate valve closed, the device is isolated from communication with the pipeline, but when the gate valve is opened the piston or plunger may be moved down into the pipeline in exposure to its flowing content, and electric circuit of the detector element or thermistor provides the change-indications responsive to the temperature characteristics of changing slugs in the pipeline, such electrical indications being as well known in connection with thermo-sensitive elements and needing no further elaboration here. An additional advantage of the mounting with a gate valve housing, is that the detector device can be withdrawn and repaired when necessary, the gate valve being closed and guarding the pipeline.

Other modes of applying the principle of the invention may be employed, change being made as regards the details described, provided the features stated in any of the following claims or the equivalent of such be employed.

I therefore particularly point out and distinctly claim as my invention:

1. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, packing-ring means on the piston, said piston having a screw-threaded stem extending back through the cylinder and there-out, and having a smooth stem extending toward the pipeline, an operating nut engaging the screw-threaded stem on the end of the cylinder, a handle for said nut, said smooth stem of the piston having a longitudinal groove, an indexing set-screw carried by the cylinder and engaging said groove, a screw-threaded insert on the end of said smooth stem toward the pipeline, a thermistor carried by said insert, electric conductor means extending in a bore through the piston to the thermistor, a hermetic pressure seal in said insert against the electric conductor means, a locking cap on the free end of said insert, a protecting screen about the thermistor carried by said cap, and a yieldable compression element in tapering wedgable contact between said cap and the electric conductor means, said element having longitudinal slots on its periphery and having a pressure relief duct from its internal end to a point outside said cap.

2. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, packing-ring means on the piston, said piston having a screw-threaded stem extending back through the cylinder and there-out, and having a smooth stem extending toward the pipeline, operating nut means for moving the piston toward and from the pipeline, said smooth stem of the piston having a longitudinal groove, an indexing set-screw carried by the cylinder and engaging said groove, a screw-threaded insert on the end of said smooth stem toward the pipeline, a thermistor carried by said insert, electric conductor means extending in a bore through the piston to the thermistor, a hermetic pressure seal in said insert against the electric conductor means, a locking cap on the free end of said insert, a protecting screen about the thermistor carried by said cap, and a yieldable compression element in tapering wedgeable contact between said cap and the electric conductor means, said element having longitudinal slots on its periphery and having a pressure relief duct from its internal end to a point outside said cap.

3. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, packing-ring means on the piston, said piston having a screw-threaded stem extending back through the cylinder and there-out, and having a smooth stem extending toward the pipeline, operating nut means for moving the piston toward and from the pipeline, said smooth stem of the piston having a longitudinal groove, an indexing set-screw carried by the cylinder and engaging said groove, a screw-threaded insert in the end of said smooth stem toward the pipeline, a detector carried by said insert, electric conductor means extending in a bore through the piston to said detector, a locking cap on the free end of said insert, a protecting screen about the detector on said cap, and a yieldable compression element in tapering wedgeable contact between said cap and the electric conductor means, said element having longitudinal slots on its periphery and having a pressure relief duct from its internal end to a point outside said cap.

4. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, said piston having a stem extending back through the cylinder and there-out and having a smooth stem extending toward the pipeline, operating means for moving the piston toward and away from the pipeline, a screw-threaded insert in the end of the stem toward the pipeline, a thermistor carried by said insert, electric conductor means extending in a bore through the piston to the thermistor, a locking cap on the free end of said insert, and yieldable compression means between said cap and the electric conductor means.

5. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, said piston having a stem extending back through the cylinder and there-out, and having a smooth stem extending toward the pipeline, operating means for moving the piston toward and away from the pipeline, said operating means holding the piston against free axial displacement in any such position of adjustment, support means on the end of said stem toward the pipeline, detector means carried thereby, electric conductor means extending from said detector means through a bore provided therefor in said piston, and means sealing the conductors in such bore.

6. In a device of the character described, the combination with a pipeline of a nipple thereon communicating with the interior, a gate valve housing on said nipple, a piston-containing cylinder connecting on the gate valve housing, a piston in said cylinder movable through the gate valve and into the pipeline when the valve is open, said piston having a stem extending back through the cylinder and there-out, and having a smooth stem extending toward the pipeline, screw-threaded operating means for moving the piston toward and away from the pipeline, means preventing rotary movement of the piston including a longitudinal groove on the stem and an indexing set-screw carried by the cylinder and engaging said groove, support means at the end of said stem toward the pipeline, detector means carried thereby, electric conductor means extending in a bore through the piston to the detector means, and means sealing the bore about said electric conductor means.

References Cited in the file of this patent

UNITED STATES PATENTS

| | | |
|---|---|---|
| 1,739,711 | Crell | Dec. 17, 1929 |
| 1,769,463 | Rice | July 1, 1930 |
| 1,978,992 | Donnelly | Oct. 30, 1934 |
| 2,025,015 | Byrns | Dec. 17, 1935 |
| 2,580,182 | Morgan | Dec. 25, 1951 |
| 2,620,658 | Piety | Dec. 9, 1952 |
| 2,625,039 | Wagner | Jan. 13, 1953 |

OTHER REFERENCES

Pages 1 and 2 of the Article "Thermistors In" appearing in the January 1945 copy of "Electronic Industries."